United States Patent [19]

Gaudreau et al.

[11] Patent Number: 4,936,762
[45] Date of Patent: Jun. 26, 1990

[54] TEST MOLD

[75] Inventors: Laurent R. Gaudreau, S. Berwick, Me.; Ching T. Lue, Dover, N.H.; Robert Grimmer, Berwick, Me.

[73] Assignee: Davidson Textron Inc., Dover, N.H.

[21] Appl. No.: 448,511

[22] Filed: Dec. 11, 1989

Related U.S. Application Data

[63] Continuation of Ser. No. 282,192, Dec. 7, 1988.

[51] Int. Cl.$^5$ .................. B28B 7/18; B29C 45/36
[52] U.S. Cl. .................. 425/4 R; 249/124; 249/176; 264/46.5; 425/117; 425/577; 425/817 R
[58] Field of Search ............... 249/176, 151, 142, 183, 249/121, 105, 108, 175, 177, 124; 264/46.4, 46.5, 46.8, 46.6; 425/4 R, 817 R, 577, 117

[56] References Cited

U.S. PATENT DOCUMENTS

| | | | |
|---|---|---|---|
| 2,341,499 | 2/1944 | Cunningham | 249/151 |
| 2,821,082 | 1/1958 | Black | 249/142 |
| 2,829,400 | 4/1958 | Morin | 249/142 |
| 3,229,615 | 1/1966 | Rattner | 249/151 |
| 3,318,563 | 5/1967 | Downing | 249/176 |
| 3,384,335 | 5/1968 | Schwarz | 249/176 |
| 3,482,326 | 12/1969 | Brewster | 249/126 |
| 3,629,030 | 12/1971 | Ash | 249/65 |
| 4,439,122 | 3/1984 | Besse et al. | 425/412 |

Primary Examiner—Jay H. Woo
Assistant Examiner—K. P. Nguyen
Attorney, Agent, or Firm—John C. Evans

[57] ABSTRACT

This disclosure illustrates and describes a test mold for the quantitative measure of the effects of formulation and/or process variable changes on some kinds of surface problems of a molded part caused by different degrees of imperfection or voiding underneath the part surface. The molded part can be single component or composite, solid or foamed. One example of the surface problem is the so-called "measles or cellulite" problem observed on the vinyl surface of a vinyl/foam composite due to the voids or rattiness within the foam. To accomplish this result, the mold has various sized, spaced apart, aligned openings formed in each of the front and rear walls of the mold, but with the centers thereof at different elevations in the respective front and rear walls. Removable rods inserted through the aligned mold wall openings produce longitudinal openings through the part which is molded around the rods, permitting the effect thereof on the surface of the molded part to be evaluated.

1 Claim, 1 Drawing Sheet

TEST MOLD

This is a continuation of application Ser. No. 282,192, filed on Dec. 7, 1988 now pending.

FIELD OF THE INVENTION

This invention relates generally to reaction injection or conventional type molds and, more particularly, to such molds which serve to produce molded parts having simulated variable voids formed therein for evaluating the effect of polyurethane and vinyl formulation processing variables on the surface appearance of the foam molded parts.

BACKGROUND OF THE INVENTION

Heretofore, test molds for producing foam molded parts having simulated variable voids formed therein have not been available. Hence, the study of surface appearances resulting from polyurethane; and vinyl formulation processing variables of known sizes and locations has not been possible.

SUMMARY OF THE INVENTION

Accordingly, a general object of the invention is to provide a test mold assembly wherein predetermined voids or imperfect foam substructures may be produced in polyurethane composition foam parts with vinyl surfaces molded therein.

Another object of the invention is to provide a means to quantify the effect of formulation and/or processing variables on defect conditions of molded parts.

Another object of the invention is to provide a test mold assembly including a mold and cover therefor, and a plurality of various diameter rods removably mounted therein.

A further object of the invention is to provide such a test mold assembly, wherein the various diameter rods are mounted at predetermined angles along the length of the mold to vary the distance between the centers of the respective rods and the bottom surface of the mold.

Still another object of the invention is to provide a reaction injection and/or conventional type mold assembly wherein a plurality of various diameter rods are removably mounted, and into which a vinyl skin shell may be mounted and a polyurethane composition poured to become bonded to the shell and reacts to completion or "cures" in the mold in the usual manner until the entire cavity around the rods is filled. Removal of the rods thus produces "voids" on the molded part.

A still further object of the invention is to provide a test mold assembly including a mold, a cover, and rods of different predetermined diameters mounted through respective openings formed in the front and rear walls of the mold at different front and rear elevations therein.

These and other objects and advantages will become more apparent when reference is made to the following drawing and the accompanying description.

BEST MODE OF CARRYING OUT THE INVENTION

Figure 1:
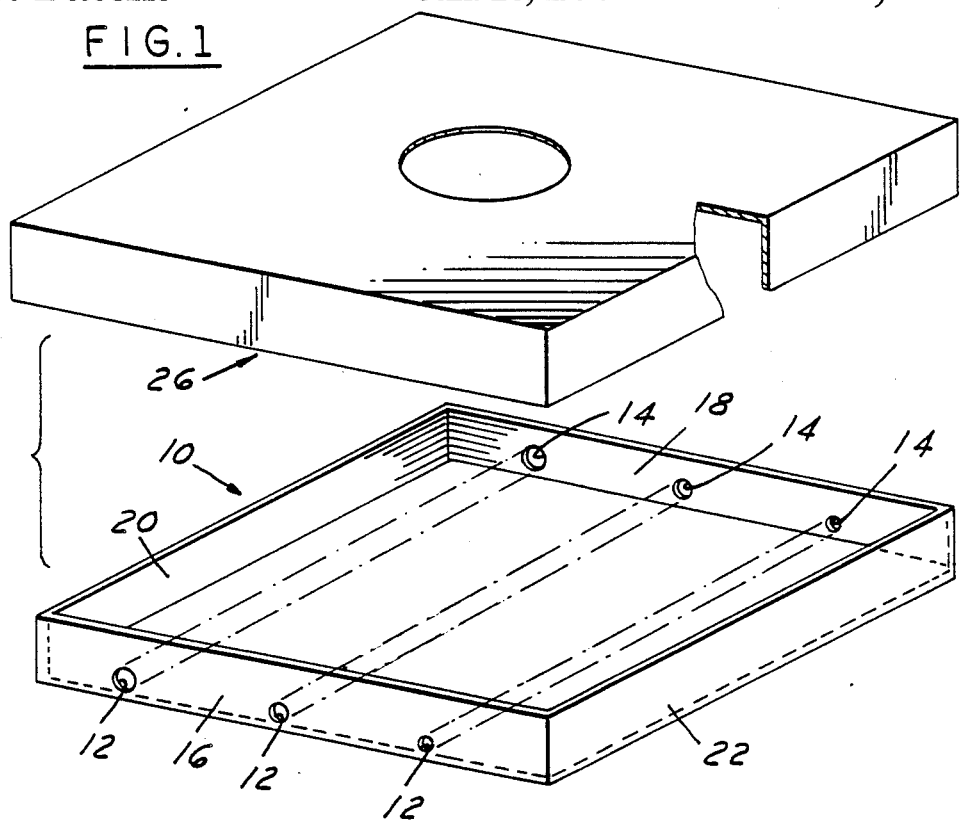
FIG. 1 is a perspective view of a mold assembly embodying the invention.
Figure 2:
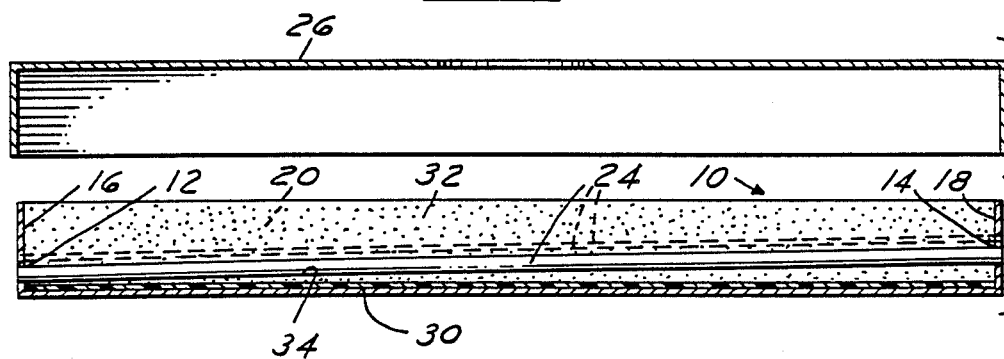
FIG. 2 is a side elevational view of the inventive mold assembly with a vinyl skin shell and polyurethane composition enclosed therein.

Referring now to the drawings in greater detail, FIG. 1 illustrates a reaction or foam pour test mold 10, which may be referred to as a "measles model" mold, having a plurality of equally spaced openings 12 and 14 formed in the respective disposed front and rear walls 16 and 18 thereof. Proceeding from left to right in FIG. 1, each succeeding opening 12 and 14 is progressively smaller in diameter, e.g., ⅜ inch, 5/16 inch, and ¼ inch, with the openings 12 in the front wall 16 having their respective lowermost edges the same predetermined distance from the bottom surface of the mold 10, e.g., 0.040 inch, and the openings 14 in the rear wall 18 having their lowermost edges a second predetermined distance from the bottom surface of the mold, e.g., 0.160 inch. For such dimensions, the suggested mold height is one inch, with all four sides 12 inches in length. The openings 12 and 14 are thus seen to be three inches apart at their centers from each other and/or from the adjacent side walls 20 and 22. Rods 24 of ⅜, 5/16 and ¼ inch diameter, respectively, are adapted to be removably inserted through the respective ⅜, 5/16 and ¼ inch diameter openings 12 and 14. A cover 26 is removably attached to the mold 10 by suitable clamp means (not shown).

In operation, a thin vinyl skin shell 30, which has been molded in a separate slush mold operation, such as that disclosed in U.S. Pat. No. 4,562,032, issued Dec. 31, 1985, is first placed in the bottom of the open mold 10. The rods 24 are covered with a release coating and inserted through the respective aligned openings 12 and 14. A suitable reactive plastic formulation 32, e.g., a reaction injection molding or conventional low pressure polyurethane composition, is then poured into the mold and the mold covered with the cover 26. In view of the locations of the openings 12 and 14 in the respective front and rear walls 16 and 18, the rods 24 are installed at an angle along the length of the mold 10, such that the distance between the rods and the vinyl skin shell 30 progressively changes along the length of the rods.

The polyurethane reacts to completion or cures in the mold in the usual manner until it fills the entire cavity of the mold around the rods 24. The rods are then removed, leaving openings 34 in the vinyl shell polyurethane composite plaque, simulating voids or, so-called, "ratty" foam, after which the composite is removed from the mold 10.

The foamed article is then subjected to elevated temperatures, and the resultant surface appearance observed by noting the length and degree of any lowered and/or raised sections over the various openings 34. Hence, the test or measles mold 10 has served to simulate voids in a foam molded part and their effects on the appearance of such molded part, illustrating defects known in the industry as measles or cellulite.

INDUSTRIAL APPLICABILITY

It should be apparent that the invention provides a simple, efficient and economical test mold, with which simulated voids may be formed and their effect on the appearance of foam molded parts studied for particular reaction injection molding or conventional low pressure polyurethane compositions, to quantify a type of defect known as measles or cellulite.

It should also be apparent that the invention provides the ability to quantify the effect of formulation and/or processing variables by measuring the length of the deformation along the longitudinal axis of the simulated defects.

While but one embodiment of the invention has been shown and described, various dimensional modifications thereof may be utilized within the scope of the following claims.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A test mold assembly for evaluating the surface deformation tendency of reactive plastic formulations to voids therein, said test mold assembly comprising:
   a mold having a rectilinear bottom and spaced pairs of side walls joined to said rectilinear bottom for forming a mold cavity to receive foam precursors;
   a plurality of test rods extending across said mold cavity between one of said pairs of side walls;
   means for removably supporting said test rods within said one of said pairs of side walls for separation from said mold cavity without removing molded material from said mold cavity;
   said test rods having a constant circular cross-section throughout the full length thereof; said test rods each having a different diameter outer surface with a top and a bottom line segment;
   said different diameter outer surfaces each having said bottom line segment located in a common plane which is inclined with respect to said bottom in a first axial direction thereof;
   each of said different diameter outer surfaces having said top line segment thereof located in a common plane which is inclined with respect to said bottom in a second direction different from said first direction thereof;
   said test rods producing a plurality of longitudinal holes of varying diameter within molded material in said mold cavity which holes vary in depth below the molded material between both said first and second pairs of side walls.

* * * * *